(12) United States Patent
Shiraishi et al.

(10) Patent No.: US 11,167,768 B2
(45) Date of Patent: Nov. 9, 2021

(54) VEHICLE DRIVING ASSIST SYSTEM

(71) Applicant: SUBARU CORPORATION, Tokyo (JP)

(72) Inventors: Eiichi Shiraishi, Tokyo (JP); Takayuki Nagase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 201 days.

(21) Appl. No.: 16/241,713

(22) Filed: Jan. 7, 2019

(65) Prior Publication Data
US 2019/0300013 A1 Oct. 3, 2019

(30) Foreign Application Priority Data
Mar. 29, 2018 (JP) .............................. JP2018-063562

(51) Int. Cl.
*B60W 50/08* (2020.01)
*G05D 1/00* (2006.01)
(Continued)

(52) U.S. Cl.
CPC .......... *B60W 50/082* (2013.01); *B60W 50/10* (2013.01); *G05D 1/0061* (2013.01);
(Continued)

(58) Field of Classification Search
CPC .... B60W 50/082; B60W 50/10; B60W 50/14; B60W 2540/18; B60W 2540/00;
(Continued)

(56) References Cited

U.S. PATENT DOCUMENTS 8,260,482 B1 * 9/2012 Szybalski ............... G01S 19/10
701/23
2003/0189493 A1 10/2003 Klausner et al.
(Continued)

FOREIGN PATENT DOCUMENTS

JP 05-170118 A 7/1993
JP 11-091397 A 4/1999
(Continued)

OTHER PUBLICATIONS

EPO English translation Künzer WO 2018211033 A1 (Year: 2021).*
(Continued)

*Primary Examiner* — Kevin P Mahne
(74) *Attorney, Agent, or Firm* — McDermott Will & Emery LLP

(57) ABSTRACT

A vehicle driving assist system includes a steering wheel contact position detector, a steering torque detector, a driving mode setting calculator, and a steering override determiner. The driving mode setting calculator is configured to set a driving mode including a first driving assist mode, a second driving assist mode, and a manual driving mode. The driving mode setting calculator is configured, while traveling in a current driving mode that is the first driving assist mode or the second driving assist mode, to allow the current driving mode to continue in a case where the steering override determiner has determined that a steering torque detected by the steering torque detector is a false detection or to cause the driving mode to make a transition to the manual driving mode in a case where the steering override determiner has determined that the steering torque is a steering override intended by a driver.

11 Claims, 8 Drawing Sheets

(51) Int. Cl.
    *B60W 50/10* (2012.01)
    *B60W 50/00* (2006.01)
(52) U.S. Cl.
    CPC ... *G05D 1/0088* (2013.01); *B60W 2050/0073* (2013.01); *B60W 2540/18* (2013.01); *G05D 2201/0213* (2013.01)
(58) Field of Classification Search
    CPC .......... B60W 60/007; B60W 60/0055; B60W 60/0053; B60W 60/0072; B60W 2422/50; B60W 2050/0095; B60W 2510/202; B60W 30/16; B60W 30/112; B60W 30/182; G05D 1/0061; G05D 1/0088; G05D 2201/0213; B60K 28/02
    See application file for complete search history.

(56) References Cited

U.S. PATENT DOCUMENTS

| | | | |
|---|---|---|---|
| 2005/0043867 A1 | 2/2005 | Kudo | |
| 2011/0098890 A1* | 4/2011 | Lee | B62D 1/286 701/42 |
| 2014/0052337 A1* | 2/2014 | Lavoie | B62D 15/027 701/41 |
| 2016/0207537 A1* | 7/2016 | Urano | B60W 50/16 |
| 2016/0288707 A1* | 10/2016 | Matsumura | G08G 1/167 |
| 2017/0017233 A1* | 1/2017 | Ichikawa | B60W 40/00 |
| 2017/0351256 A1 | 12/2017 | Kumakiri et al. | |
| 2019/0241195 A1* | 8/2019 | Sakamoto | G08G 1/16 |
| 2019/0300021 A1* | 10/2019 | Li | F16H 61/0248 |
| 2021/0146943 A1* | 5/2021 | Oniwa | B62D 6/00 |

FOREIGN PATENT DOCUMENTS

| | | |
|---|---|---|
| JP | 2009-214680 A | 9/2009 |
| JP | 4435519 B2 | 3/2010 |
| JP | 5009473 B2 | 8/2012 |
| JP | 2015-229417 A | 12/2015 |
| JP | 2016-084093 A | 5/2016 |
| JP | 2017-218020 A | 12/2017 |
| WO | WO2018/211033 | * 11/2018 |

OTHER PUBLICATIONS

Japanese Notice of Reasons for Refusal issued in corresponding Japanese Patent Application No. 2018-063562, dated Sep. 24, 2019, with English translation.

* cited by examiner

VEHICLE DRIVING ASSIST SYSTEM

CROSS-REFERENCE TO RELATED APPLICATIONS

The present application claims priority from Japanese Patent Application No. 2018-063562 filed on Mar. 29, 2018, the entire contents of which are hereby incorporated by reference.

BACKGROUND

The technology relates to a vehicle driving assist system that assists a driver in driving a vehicle.

Various proposals have been made on driving assist systems with automatic driving that are to reduce a burden imposed on a driver and allow for comfortable driving. Some of such proposals have already been put into practical use in recent vehicles.

Driving modes of such a driving assist system include a driving assist mode in which a driver is made to stand by so that the driver is able to take over a driving operation when a control system of a vehicle determines that continuation of automatic driving is difficult, and another driving assist mode in which the driver is not required to take over the driving operation even when the control system of the vehicle determines that the continuation of the automatic driving is difficult. Hereinafter, the former and the latter are referred to as a "first driving assist mode" and a "second driving assist mode," respectively.

The first driving assist mode causes an own vehicle to travel along a lane line following a preceding vehicle in front of the own vehicle through known active lane keep (ALK) control and an adaptive cruise control (ACC) system. In a case where no preceding vehicle is detected in front of the own vehicle, the own vehicle travels at a preset constant vehicle speed. Accordingly, the first driving assist mode is based on a condition that, although the driver does not need to actively operate a steering wheel, the driver is in a state of being ready to take over the driving at any time by holding the steering wheel.

In the second driving assist mode, on the other hand, a degree of coincidence between a shape of a road on a map on which the own vehicle is traveling as detected by a map locator and a road shape of a lane line along which the own vehicle is actually traveling as detected by, for example, a camera unit is monitored on a constant basis. In a case where this degree of coincidence is high, the automatic driving is continued with a control system playing a major role without requiring the driver to hold the steering wheel with both hands. Only in a case where it is determined that the continuation of the automatic driving is difficult, the driver is requested to hold the steering wheel with both hands to make a transition into the first driving assist mode, or an automatic refuge mode is executed. In the automatic refuge mode, the own vehicle is made to travel in its driving lane at a legally permitted or designated lowest speed. Alternatively, the own vehicle is guided to a safe location, such as a side strip or a pedestrian walkway, and is stopped.

In a case where the driver takes hold of the steering wheel while the own vehicle is traveling in the second driving assist mode, the driving assist system determines this to be the driver's intention and causes the driving mode to make a transition to the first driving assist mode. In addition, in a case where the driving assist system has detected a steering intervention by the driver (i.e., a steering override), the automatic driving is suspended, and the driving mode is caused to make a transition to a manual driving mode. In a case where this transition is an erroneous operation, however, this operation is against the intention of the driver who is to continue with the automatic driving and may cause a sense of discomfort in the driver.

Japanese Patent (JP-B) No. 5009473 discloses a technique for determining whether a driver is holding a steering wheel, for example. According to this technique, a touch sensor, such as a pressure sensor, a capacitance sensor, or an electrode pair, is provided on a rim of a steering wheel to determine whether a driver is holding the steering wheel and the position on the steering wheel at which the driver holds the steering wheel.

In addition, JP-B No. 4435519 discloses a technique for detecting a steering intervention by a driver. According to this technique, a steering torque detected by a torque sensor is compared against a threshold set on the basis of a vehicle speed. In a case where the steering torque is equal to or greater than the threshold, the steering torque is determined to be a steering intervention by the driver, and the automatic steering is cancelled.

SUMMARY

An aspect of the technology provides a vehicle driving assist system that includes: a steering wheel contact position detector configured to detect a position on a steering wheel at which a driver makes a contact with the steering wheel; a steering torque detector configured to detect a steering torque of the driver; a driving mode setting calculator configured to set a driving mode of an own vehicle on a basis of a driving condition, in which the driving mode includes a first driving assist mode, a second driving assist mode, and a manual driving mode, the first driving assist mode allows for automatic driving that is based on a condition that the driver holds the steering wheel, the second driving assist mode allows for the automatic driving that is not based on the condition that the driver holds the steering wheel, and the manual driving mode allows the driver himself/herself to steer the steering wheel; and a steering override determiner configured to determine whether the steering torque detected by the steering torque detector is a steering override intended by the driver or a false detection, on a basis of the position on the steering wheel at which the driver makes the contact with the steering wheel detected by the steering wheel contact position detector and the steering torque detected by the steering torque detector. The driving mode setting calculator is configured, while traveling in a current driving mode that is one of the first driving assist mode and the second driving assist mode, to allow the current driving mode to continue in a case where the steering override determiner has determined that the steering torque is the false detection or to cause the driving mode to make a transition to the manual driving mode in a case where the steering override determiner has determined that the steering torque is the steering override.

An aspect of the technology provides a vehicle driving assist system that includes: a contact position detector configured to detect a position on a steering wheel at which a driver makes a contact with the steering wheel; a torque detector configured to detect a steering torque of the driver; and circuitry configured to set a driving mode of an own vehicle on a basis of a driving condition, in which the driving mode includes a first driving assist mode, a second driving assist mode, and a manual driving mode, the first driving assist mode allows for automatic driving that is based on a condition that the driver holds the steering wheel, the second driving assist mode allows for the automatic driving that is not based on the condition that the driver holds the steering wheel, and the manual driving mode allows the driver himself/herself to steer the steering wheel, determine whether the steering torque detected by the torque detector is a steering override intended by the driver or a false detection on a basis of the position on the steering wheel at which the driver makes the contact with the steering wheel detected by the contact position detector and the steering torque detected by the torque detector, allow, while traveling in a current driving mode that is one of the first driving assist mode and the second driving assist mode, the current driving mode to continue in a case where the steering torque detected by the torque detector is determined to be the false detection, and cause the driving mode to make a transition to the manual driving mode in a case where the steering torque detected by the torque detector is determined to be the steering override.

DETAILED DESCRIPTION

Figure 1:
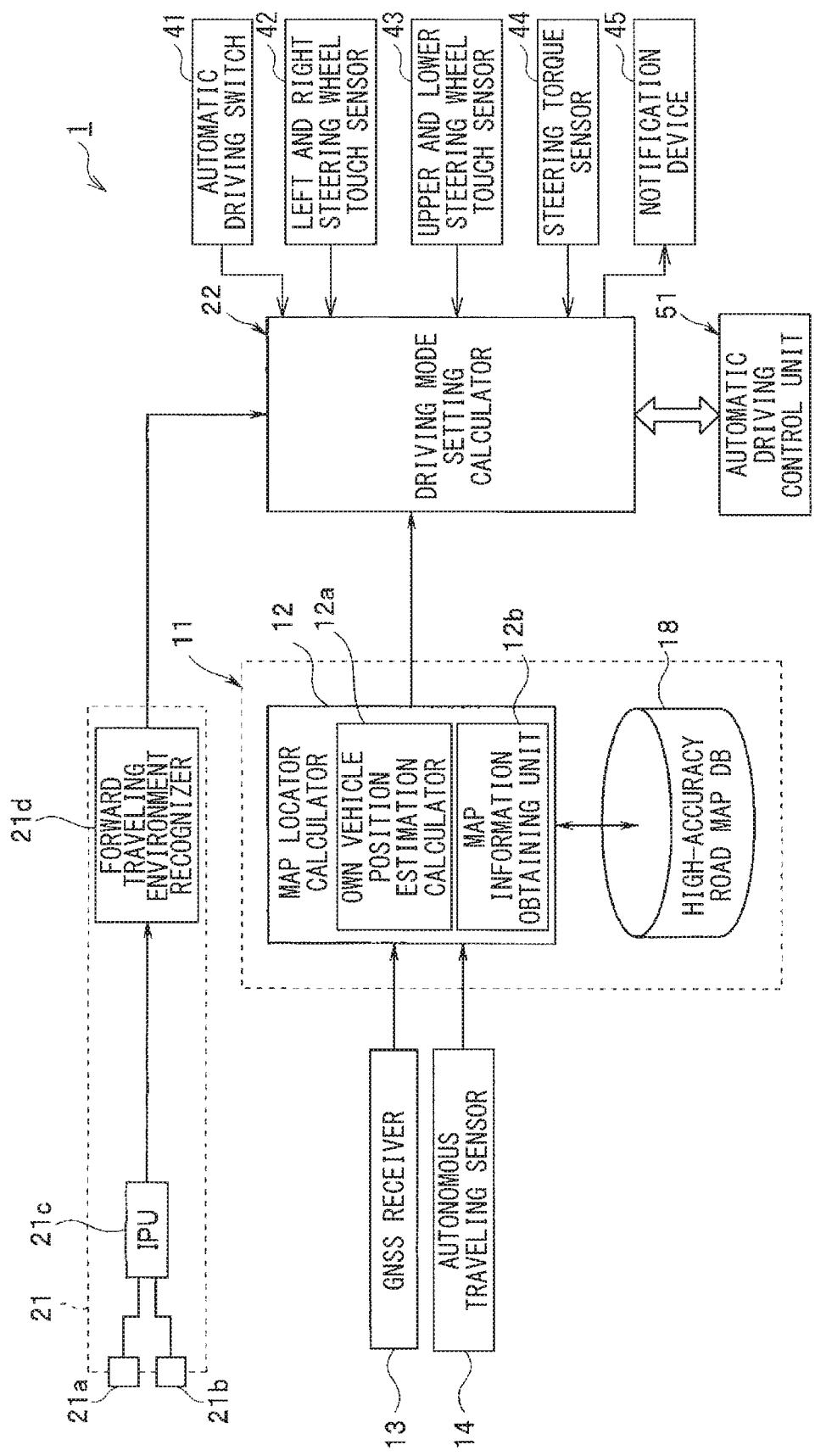
FIG. 1 schematically illustrates an example of a configuration of a vehicle driving assist system according to one implementation of the technology.

Hereinafter, some implementations of the technology will be described with reference to the drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

According to the technique disclosed in JP-B No. 4435519, the driver's intention on the steering intervention is detected by detecting the steering torque with the torque sensor.

However, in traveling in the second driving assist mode, the driver is not required to hold the steering wheel. Thus, the driver is likely to take such action as changing his/her posture by, for example, turning rearward during traveling. At this point, in a conceivable case, a portion of the body may be pressed against the steering wheel to produce a steering torque in an unintended direction. Determining the thus-produced steering torque as a steering intervention goes against the driver's intention, and in a case where the driver is given a notification stating "transition will be made to the manual driving mode," for example, the driver may experience a sense of discomfort.

Even in a case where the own vehicle is traveling in the first driving assist mode, which is based on the condition that the driver holds the steering wheel with both hands, in a case where the torque sensor detects a steering torque that is traceable to external disturbance, such as an uneven road surface or a side wind, this steering torque may possibly be determined erroneously to be a steering intervention by the driver (i.e., a steering override).

It is desirable to provide a vehicle driving assist system that makes it possible to reduce any sense of discomfort to be experienced by a driver.

Figure 9A:
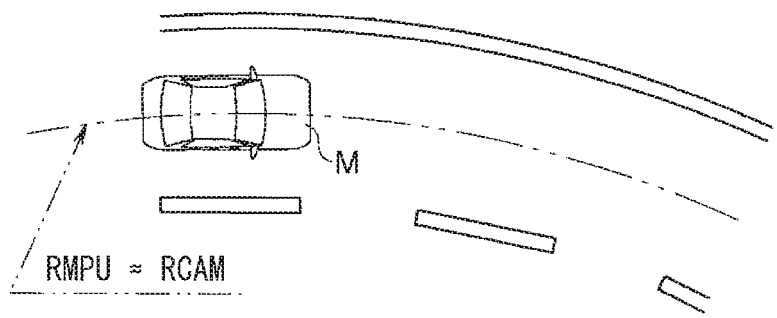
FIG. 9A illustrates a state in which a road curvature on a map and a road curvature recognized by a camera unit coincide with each other.
Figure 9B:
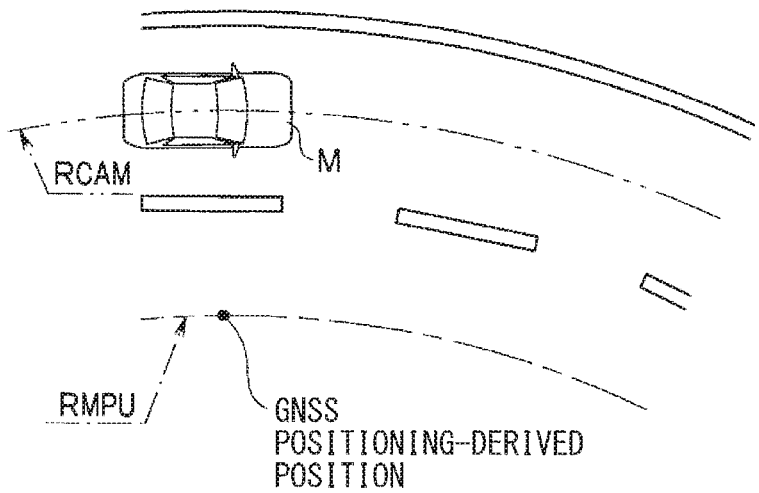
FIG. 9B illustrates a state in which the road curvature on the map and the road curvature recognized by the camera unit differ from each other.

Referring to FIG. 1, a driving assist system may be mounted on an own vehicle M, as illustrated in FIGS. 9A and 9B. The driving assist system 1 may include a sensor unit that detects a shape of a road around the own vehicle M. The sensor unit may include a locator unit 11 and a camera unit 21. In one implementation, the camera unit 21 may serve as a "traveling environment recognizer." The locator unit 11 and the camera unit 21 may constitute a completely independent multiplex system in which the locator unit 11 and the camera unit 21 do not depend on each other. Furthermore, a redundant system may be constructed that, in a case where one of the locator unit 11 and the camera unit 21 malfunctions, causes the automatic driving to be temporarily continued with the other one of the locator unit 11 and the camera unit 21 and allows the driver to safely take over the driving of the own vehicle M.

The driving assist system 1 may monitor whether the shape of the road on which the own vehicle M is currently traveling as detected by the locator unit 11 is identical to the shape of the same road as detected by the camera unit 21 and allow the automatic driving to continue in a case where the shapes of the road are identical. In the example implementation, a road curvature may be detected to determine the identicalness of the shapes of the road by the locator unit 11 and the camera unit 21.

The locator unit 11 may estimate a position of the own vehicle M (i.e., an own vehicle position) on a road map and acquire map data of the road ahead of the own vehicle position. The camera unit 21 may recognize lane lines that define right and left of a lane in which the own vehicle M is traveling. The camera unit 21 may also determine a road curvature in the middle of the recognized lane lines and detect a lateral position deviation. The lateral position deviation may be a deviation of the own vehicle M in a vehicle-width direction and based on the middle of the recognized lane lines serving as a reference.

The locator unit 11 may include a map locator calculator 12 and a high-accuracy road map database 18. In one implementation, the high-accuracy road map database 18 may serve as a "storage." The map locator calculator 12, a forward traveling environment recognizer 21d, a driving mode setting calculator 22, and an automatic driving control unit 51 may each be constituted by a known microcomputer and its peripherals. The microcomputer may include such devices as a central processing unit (CPU), a random-access memory (RAM), or a read-only memory (ROM). The ROM may hold programs to be executed by the CPU and fixed data such as a data table. In one implementation, the driving mode setting calculator 22 may serve as a "driving mode setting calculator." The forward traveling environment recognizer 21d, the driving mode setting calculator 22, and the automatic driving control unit 51 will be described later in further detail.

The map locator calculator 12 may be coupled, at its input side, a global navigation satellite system (GNSS) receiver 13 and an autonomous traveling sensor 14. The GNSS receiver 13 may receive positioning signals transmitted from a plurality of positioning satellites. The autonomous traveling sensor 14 may enable autonomous traveling in an environment where reception of valid positioning signals from the positioning satellites is difficult due to, for example, a reduced reception sensitivity from the GNSS satellites. Non-limiting examples of such an environment may include traveling inside a tunnel. The autonomous traveling sensor 14 may be constituted by, for example but not limited to, a wheel speed sensor, a gyro sensor, and a forward-rearward acceleration sensor. For example, the map locator calculator 12 may perform localization from a moving distance and an orientation on the basis of one or more of a vehicle speed detected by the wheel speed sensor, an angular velocity detected by the gyro sensor, and a forward-rearward acceleration detected by the forward-rearward acceleration sensor.

The map locator calculator 12 may include an own vehicle position estimation calculator 12a and a map information obtaining unit 12b. The own vehicle position estimation calculator 12a may estimate the own vehicle position. The map information obtaining unit 12b may identify a position of the own vehicle M through map matching in which the estimated own vehicle position is matched on the road map and may also obtain information on the road shape ahead of the thus-identified position.

The high-accuracy road map database 18 may be a large-capacity storage medium such as a hard disk drive (HDD) and hold highly accurate road map information (e.g., a dynamic map). The high-accuracy road map information may contain lane data that is necessary for performing automatic driving. Non-limiting examples of the lane data may include data on a width of a lane, data on coordinates of a middle position in the lane, data on azimuth in a traveling direction of the lane, and data on a speed limit. The lane data may be set for each lane on the road map at an interval of several meters.

The map information obtaining unit 12b may obtain information on the road map of a current location from the road map information stored in the high-accuracy road map database 18. From the thus-obtained road map information, the map information obtaining unit 12b may obtain route map information on the basis of, for example, a destination set by a driver for the automatic driving. The route map information may be map information related to a route from the own vehicle position (i.e., the current location) estimated by the own vehicle position estimation calculator 12a to the destination. The map information obtaining unit 12b may transmit the thus-obtained route map information (i.e., the lane data on the route map and its peripheral information) to the own vehicle position estimation calculator 12a.

The own vehicle position estimation calculator 12a may obtain coordinates of the position of the own vehicle M on the basis of the positioning signals received by the GNSS receiver 13. The own vehicle position estimation calculator 12a may perform map matching of the obtained position coordinates onto the route map information to thereby estimate the own vehicle position (i.e., the current location) on the road map and to thereby identify a lane in which the own vehicle M is traveling. The own vehicle position estimation calculator 12a may also obtain the road shape of the traveling lane of the own vehicle M stored in the route map information and successively store the obtained road shape of the traveling lane. In other words, in the example implementation, the own vehicle position estimation calculator 12a may obtain a road curvature RMPU [1/m] of the middle of the lane, as illustrated in FIGS. 9A and 9B, and successively store the obtained road curvature RMPU. Hereinafter, the thus-obtained road curvature RMPU is referred to as a "map curvature RMPU."

Furthermore, the own vehicle position estimation calculator 12a may switch to an autonomous navigation in an environment where reception of valid positioning signals from the positioning satellites is difficult due to, for example, a reduced sensitivity of the GNSS receiver 13. Non-limiting examples of such an environment may include traveling inside a tunnel. In the autonomous navigation, the own vehicle position estimation calculator 12a may estimate the own vehicle position on the basis of one or more of the vehicle speed detected by the wheel speed sensor, the angular velocity detected by the gyro sensor, and the forward-rearward acceleration detected by the forward-rearward acceleration sensor. By performing the autonomous navigation, the own vehicle position estimation calculator 12a may estimate the own vehicle position on the road map and obtain the curvature (i.e., the map curvature) RMPU of the road on which the own vehicle M is traveling.

The camera unit 21 may include a vehicle-mounted camera, an image processing unit (IPC) 21c, and the forward traveling environment recognizer 21d. The vehicle-mounted camera may be provided inside a vehicle interior of the own vehicle M and fixed at an upper-middle part of the front of the vehicle interior. The vehicle-mounted camera may include a main camera 21a and a sub camera 21b. The main camera 21a and the sub camera 21b may be disposed at their respective positions that are symmetrical across the middle of the own vehicle M in a width direction. This camera unit 21 may be a stereo camera that captures a predetermined region ahead of the own vehicle M with the main camera 21a and the sub camera 21b. The IPU 21c in the camera unit 21 may perform a predetermined image process on images captured by the main camera 21a and the sub camera 21b of a surrounding environment ahead in the traveling direction. The IPU 21c may transmit the processed surrounding environment images to the forward traveling environment recognizer 21d.

The forward traveling environment recognizer 21d may determine the road shape of the road on which the own vehicle M is to travel on the basis of the traveling environment image information ahead of the own vehicle M received from the IPU 21c. In the example implementation, on the basis of the traveling environment image information, the forward traveling environment recognizer 21d may determine the road curvature [1/m] of the lane lines that define right and left of the lane and may determine a width, or a lane width, between the right and left lane lines. Any of various known methods of determining a road curvature and a lane width may be used to determine the road curvature [1/m] of the right and left lane lines and the lane width therebetween. For example, in an example implementation, the road curvature may be determined through recognizing right and left lane lines on the basis of the traveling environment image information and determining, for each predetermined section, the curvature of each of the right and left lane lines. The right and left lane lines may be recognized through a binarization process that utilizes a difference in luminance. The curvature of each of the right and left lane lines may be determined through, for example, a curve-approximating expression that is based on a least-square method. Furthermore, in an example implementation, the lane width may be calculated from a difference between the thus-determined curvatures of the respective right and left lane lines. On the basis of the curvature of the respective right and left lane lines and the lane width, the forward traveling environment recognizer 21$d$ may determine a road curvature RCAM [1/m] of the middle of the lane, as illustrated in FIGS. 9A and 9B, and successively store the thus-determined road curvature RCAM. Hereinafter, the road curvature RCAM may be referred to as a "camera curvature RCAM." The map curvature RMPU obtained by the own vehicle position estimation calculator 12$a$ and the camera curvature RCAM estimated by the forward traveling environment recognizer 21$d$ may be supplied to the driving mode setting calculator 22.

The forward traveling environment recognizer 21$d$ may detect the presence of a preceding vehicle traveling in front of the own vehicle M on the basis of the obtained traveling environment image information. In a case where the forward traveling environment recognizer 21$d$ has detected a preceding vehicle in front of the own vehicle M, the forward traveling environment recognizer 21$d$ may calculate an inter-vehicle distance between the preceding vehicle in front and the own vehicle M (i.e., the distance from the preceding vehicle in front to the own vehicle M), a relative vehicle speed, and a time headway. Techniques for detecting a preceding vehicle in front with the use of a stereo camera and obtaining the inter-vehicle distance, the relative vehicle speed, and the time headway are well known, and thus descriptions thereof will be omitted.

Figure 2:
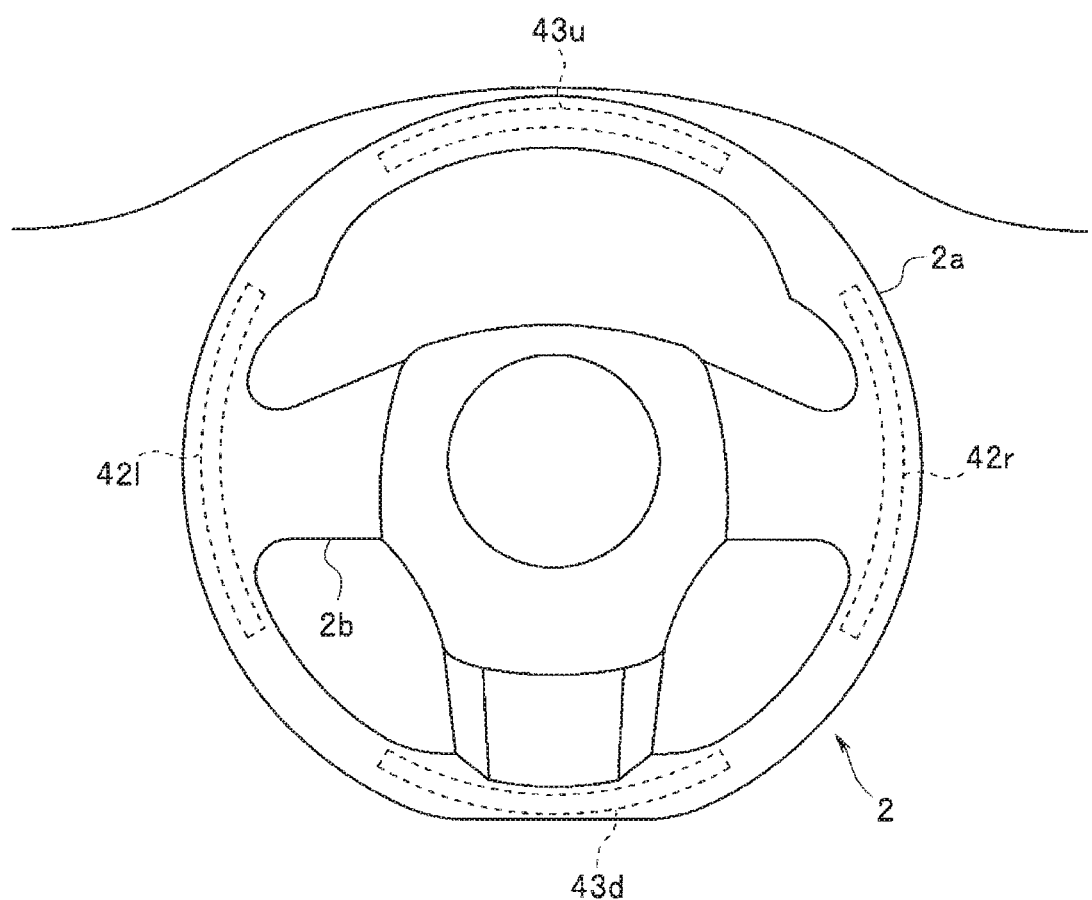
FIG. 2 is a front view illustrating an example of a steering wheel provided with a steering wheel touch sensor.

Aside from the own vehicle position estimation calculator 12$a$ and the forward traveling environment recognizer 21$d$ described above, an automatic driving switch 41, a left and right steering wheel touch sensor 42, an upper and lower steering wheel touch sensor 43, and a steering torque sensor 44 may be coupled to the input side of the driving mode setting calculator 22. The automatic driving switch 41 may allow the driver to turn on or off the automatic driving. The left and right steering wheel touch sensor 42 and the upper and lower steering wheel touch sensor 43 may detect a position on the steering wheel 2 at which the driver makes contact with the steering wheel 2, as illustrated in FIG. 2. In one implementation, the steering torque sensor 44 may serve as a "steering torque detector" or a "torque detector." In one implementation, the left and right steering wheel touch sensor 42 and the upper and lower steering wheel touch sensor 43 may serve as a "steering wheel contact position detector" or a "contact position detector" configured to detect a position on a steering wheel at which a driver makes contact with the steering wheel.

Forward traveling environment information obtained by the camera unit 21 may be supplied to an ACC control unit (not illustrated). In a case where the ACC control unit has detected a preceding vehicle traveling in front of the own vehicle M in the lane in which the own vehicle M is traveling on the basis of the forward traveling environment information, the ACC control unit may execute traveling control of following the preceding vehicle in front while keeping a predetermined inter-vehicle distance from the detected preceding vehicle in front of the own vehicle M. In a case where the ACC control detects no preceding vehicle in front of the own vehicle M, the ACC control unit may allow the own vehicle M to travel at a preset vehicle speed set by the driver.

The left and right steering wheel touch sensor 42 and the upper and lower steering wheel touch sensor 43 may be, for example but not limited to, a pressure-sensitive sensor, a pressure sensor, or a capacitance sensor. As illustrated in FIG. 2, the left and right steering wheel touch sensor 42 may include a left steering wheel touch sensor 42$l$ and a right steering wheel touch sensor 42$r$. The upper and lower steering wheel touch sensor 43 may include an upper steering wheel touch sensor 43$u$ and a lower steering wheel touch sensor 43$d$.

In one implementation, the left steering wheel touch sensor 42$l$ and the right steering wheel touch sensor 42$r$ may serve as a "first steering wheel contact position detector". In one implementation, the upper steering wheel touch sensor 43$u$ and the lower steering wheel touch sensor 43$d$ may serve as a "second steering wheel contact position detector".

The steering wheel 2 may be supported by a steering shaft (not illustrated) at a center of a rim 2$a$ via a spoke 2$b$. The left steering wheel touch sensor 42$l$ and the right steering wheel touch sensor 42$r$ may be disposed in a range that is slightly broader than a recommended steering wheel holding region. The recommended steering wheel holding region may be a region on the rim 2$a$ that is to be held by the driver in a correct posture. For example, the recommended steering wheel holding region may include, if expressed by the two hands of a clock, a left side region spanning between the tips of the short hand and the long hand indicating around 8:50 and a right side region spanning between the tips of the short hand and the long hand indicating around 2:20. The upper steering wheel touch sensor 43$u$ and the lower steering wheel touch sensor 43$d$ may be disposed in an unrecommended steering wheel holding region. The unrecommended steering wheel holding region may be upper and lower regions of the rim 2$a$ with which a body part of the driver, such as a hand or a knee, is likely to come into contact when, for example, the driver makes such body movement as turning rearward. For example, the unrecommended steering wheel holding region may include, if expressed by the two hands of a clock, an upper side region spanning between the tips of the short hand and the long hand indicating around 11:05 and a lower side region spanning between the tips of the short hand and the long hand indicating around 5:35.

The steering torque sensor 44 may detect a steering torque Tst input to the steering shaft (not illustrated) by the driver on the basis of a twist of the steering shaft. The steering torque sensor 44 may determine the presence of a steering intervention (i.e., a steering override) on the basis of the detected steering torque Tst.

A notification device 45 may be coupled to an output side of the driving mode setting calculator 22. The notification device 45 may include a sound speaker and a monitor. In one implementation, the notification device 45 may serve as a "notifier." The automatic driving control unit 51 may be so coupled to the driving mode setting calculator 22 as to be able to communicate freely and bidirectionally with the driving mode setting calculator 22. The automatic driving control unit 51 may execute any of the driving modes including a manual driving mode, a first driving assist mode, a second driving assist mode, and an automatic refuge mode set by the driving mode setting calculator 22.

The driving mode setting calculator 22 may compare the map curvature RMPU estimated by the own vehicle position estimation calculator 12a and the camera curvature RCAM estimated by the forward traveling environment recognizer 21d. The map curvature RMPU here may be directed to a location ahead of the own vehicle position. In an example implementation, the driving mode setting calculator 22 may perform the comparison on a constant basis. For example, the driving mode setting calculator 22 may check a degree of coincidence (i.e., reliability) in percentage [%] between the map curvature RMPU and the camera curvature RCAM on the basis of the own vehicle position on the map and the own vehicle position derived from the actual driving each serving as a reference. The driving mode setting calculator 22 may check the degree of coincidence between the map curvature RMPU and the camera curvature RCAM that are both derived from the same region ahead of the own vehicle M and away from the own vehicle M by a predetermined distance. The driving mode setting calculator 22 may determine that the map curvature RMPU and the camera curvature RCAM coincide with each other in a case where the degree of coincidence exceeds a preset threshold and may determine that the map curvature RMPU and the camera curvature RCAM do not coincide with each other in a case where the degree of coincidence is below the preset threshold. In an example implementation, the threshold may be the degree of coincidence in a range of from 95% to 99%.

For example, as illustrated in FIG. 9A, the driving mode setting calculator 22 may evaluate that the own vehicle M is actually traveling along a target traveling path in a case where the map curvature RMPU obtained by the locator unit 11 and the camera curvature RCAM obtained through the recognition performed by the forward traveling environment recognizer 21d coincide with each other.

For example, as illustrated in FIG. 9B, the driving mode setting calculator 22 may evaluate that the degree of coincidence (i.e., the reliability) between the map curvature RMPU and the camera curvature RCAM is low (i.e., is less than the threshold) in a case where the locator unit 11 erroneously recognizes the map curvature RMPU of an adjacent lane as the road curvature of the traveling path of the own vehicle M. The locator unit 11 may possibly recognize the map curvature RMPU erroneously in a case where the map matching of the position derived from the positioning performed by the GNSS receiver 13 is performed onto the adjacent lane due to an error. The driving mode setting calculator 22 may evaluate that the degree of coincidence, or the reliability, is low in a case where the forward traveling environment recognizer 21d fails to obtain the camera curvature RCAM due to traveling under a poor-visibility situation such as rainfall.

In a case where the driving mode setting calculator 22 has determined that the map curvature RMPU and the camera curvature RCAM coincide with each other, the driving mode setting calculator 22 may allow the second driving assist mode to continue. In an example implementation, the driving mode setting calculator 22 may cause the driving mode to make a transition from the first driving assist mode to the second driving assist mode. When the driving mode setting calculator 22 makes a transition in the driving mode, the driver may be notified of the transition in advance through the notification device 45.

In the example implementation, non-limiting examples of the set driving mode may include the manual driving mode in which the driver himself/herself manually steers the steering wheel, the first driving assist mode, the second driving assist mode, and the automatic refuge mode. The first driving assist mode and the second driving assist mode may belong to the category of automatic driving. The first driving assist mode and the second driving assist mode may be the same as each other in that they cause the own vehicle M to automatically travel along a target traveling path along which the own vehicle M is to travel, i.e., they perform the automatic driving. The first driving assist mode, however, is based on the condition that the driver holds the steering wheel, whereas the second driving assist mode is not based on the condition that the driver holds the steering wheel.

In a case where the camera unit 21 temporarily malfunctions, continuation of the autonomous driving in the second driving assist mode may become difficult. However, the driving mode may not be caused to make a transition suddenly to the manual driving mode. The driver may be first notified that the driving mode will be caused to make a transition to the first driving assist mode, and the driver may be requested to hold the steering wheel. Upon the driver holding the steering wheel 2, the driving mode may be caused to make a transition to the first driving assist mode, and the automatic driving may be continued on the basis of the own vehicle position estimated by the map locator calculator 12.

This may apply similarly in a case where the map locator calculator 12 has failed to estimate the own vehicle position. In such a case, upon the driver holding the steering wheel 2, the middle of the right and left lane lines recognized by the camera unit 21 may be set as the target traveling path, and the own vehicle M may be allowed to travel along this target traveling path.

In a case where a steering intervention by the driver (i.e., a steering override) is detected during traveling through the automatic driving in, for example, one of the first driving assist mode and the second driving assist mode, the driving mode may be caused to make a transition from the automatic driving mode to the manual driving mode.

In the steering wheel 2 illustrated in FIG. 2, typically, if the driver makes contact with, or holds, the rim 2a with both hands in a correct posture in which the driver is facing the front, the left steering wheel touch sensor 42l and the right steering wheel touch sensor 42r may both be turned on. Therefore, in a case where the driver steers the steering wheel in this posture and a steering intervention is detected on the basis of the steering torque Tst detected by the steering torque sensor 44, it is possible to determine that this steering intervention is a steering override intended by the driver. However, in a case where a steering intervention is detected on the basis of the steering torque Tst obtained when the left steering wheel touch sensor 42l, the right steering wheel touch sensor 42r, or both are off or when the upper steering wheel touch sensor 43u, the lower steering wheel touch sensor 43d, or both are on, it is possible to determine that the driver is not steering the steering wheel in the correct posture and that the detected steering intervention is a mere accidental contact (i.e., a false detection).

Causing the driving mode to make a transition immediately to the manual driving mode in a situation where merely an accidental contact, or a false detection, has been made may cause the driver to experience a sense of discomfort. Therefore, in the example implementation, whether a steering intervention (i.e., a steering override) is intended by the driver or is caused by an erroneous operation may be determined properly on the basis of both the position on the steering wheel 2 at which the driver makes contact with the steering wheel 2 and the steering torque.

The driving mode setting calculator 22 may determine whether a steering override is intended by the driver or is caused merely by an accidental contact (i.e., a false detection) in a routine for setting the driving mode as illustrated in FIGS. 3 to 7.

Figure 3:
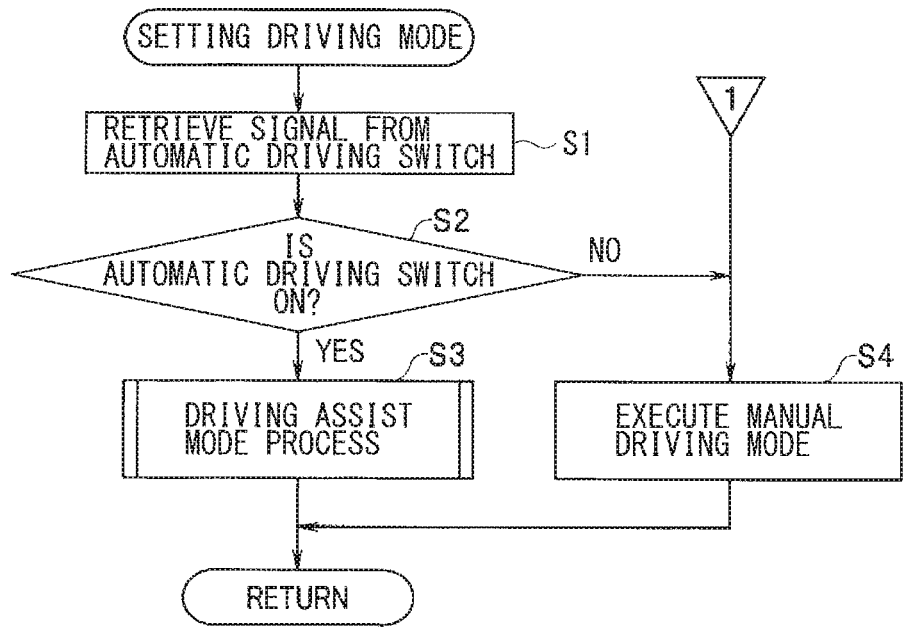
FIG. 3 is a flowchart illustrating an example of a driving mode setting routine.

Upon the own vehicle M starting traveling, a driving mode setting routine illustrated in FIG. 3 may start. At step S1, the driving mode setting calculator 22 may retrieve a signal from the automatic driving switch 41. The automatic driving switch 41 may be turned on in a case where the driver selects the automatic driving. At step S2, the driving mode setting calculator 22 may check whether the automatic driving switch 41 is on. In a case where the automatic driving switch 41 is on (S2: YES), the flow may proceed to step S3, and the driving mode setting calculator 22 may execute a driving assist mode process and exit the routine. In a case where the automatic driving switch 41 is off (S2: NO), the flow may proceed to step S4, and the driving mode setting calculator 22 may execute the manual driving mode and exit the routine. The manual driving mode thus selected as the driving mode may cause the target traveling path to be displayed on a display (not illustrated). The target traveling path may be set by a known navigation function that guides the own vehicle M to the destination. The driver may thus drive the own vehicle M by his/her own driving while following the displaying performed on the display, a voice guidance, or both.

Figure 4:
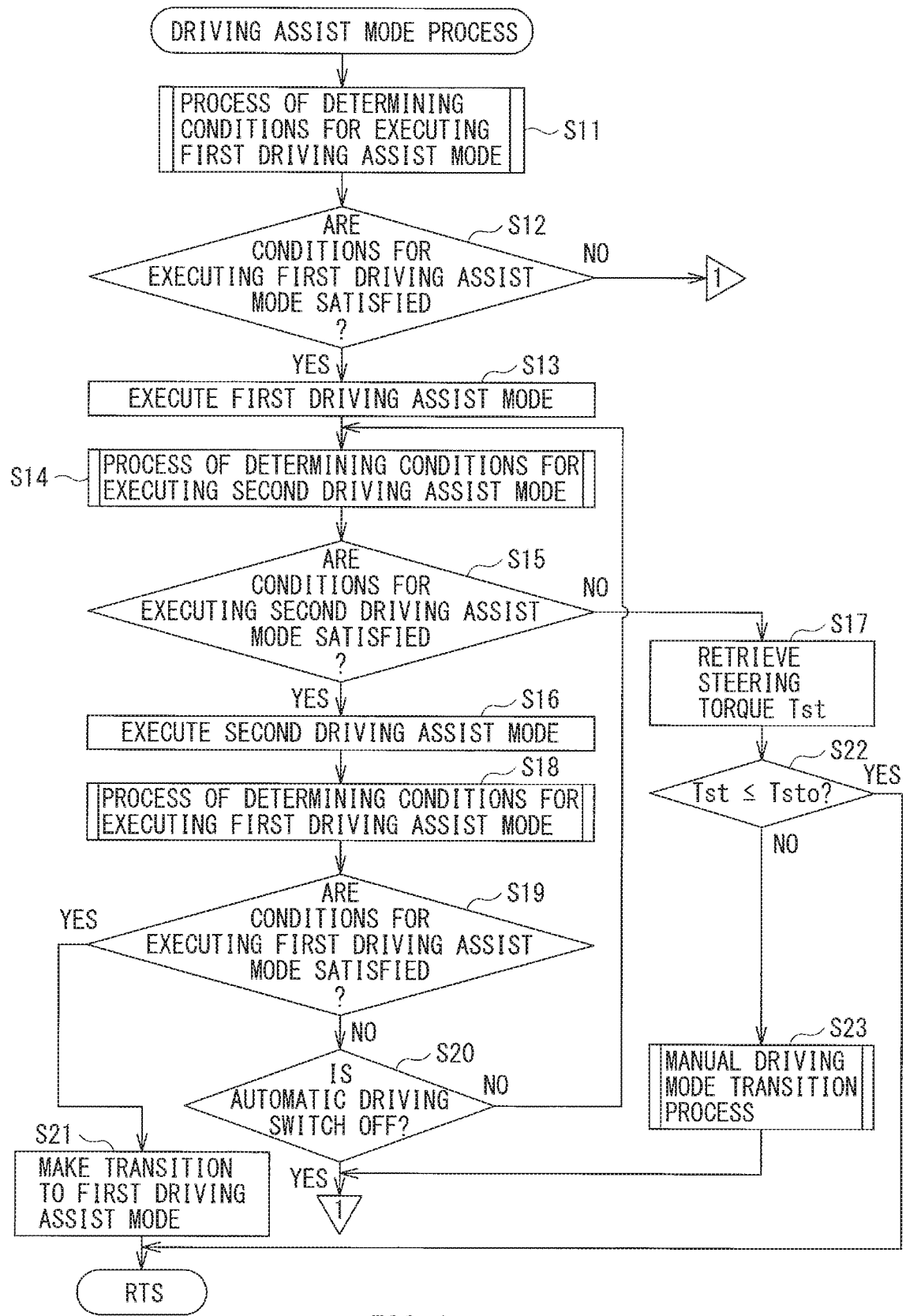
FIG. 4 is a flowchart illustrating an example of a subroutine related to a driving assist mode process.

The driving mode setting calculator 22 may execute the driving assist mode process performed at step S3 in accordance with a subroutine related to the driving assist mode process illustrated by way of example in FIG. 4. In this subroutine, at step S11, the driving mode setting calculator 22 may check whether it is possible to execute the first driving assist mode. The driving mode setting calculator 22 may check whether it is possible to execute the first driving assist mode on the basis of the lane lines that define right and left of the lane in which the own vehicle M is traveling as recognized by the forward traveling environment recognizer 21d of the camera unit 21, the left and right steering wheel touch sensor 42 (i.e., the left steering wheel touch sensor 421 and the right steering wheel touch sensor 42r), and the steering torque Tst detected by the steering torque sensor 44.

Figure 5:
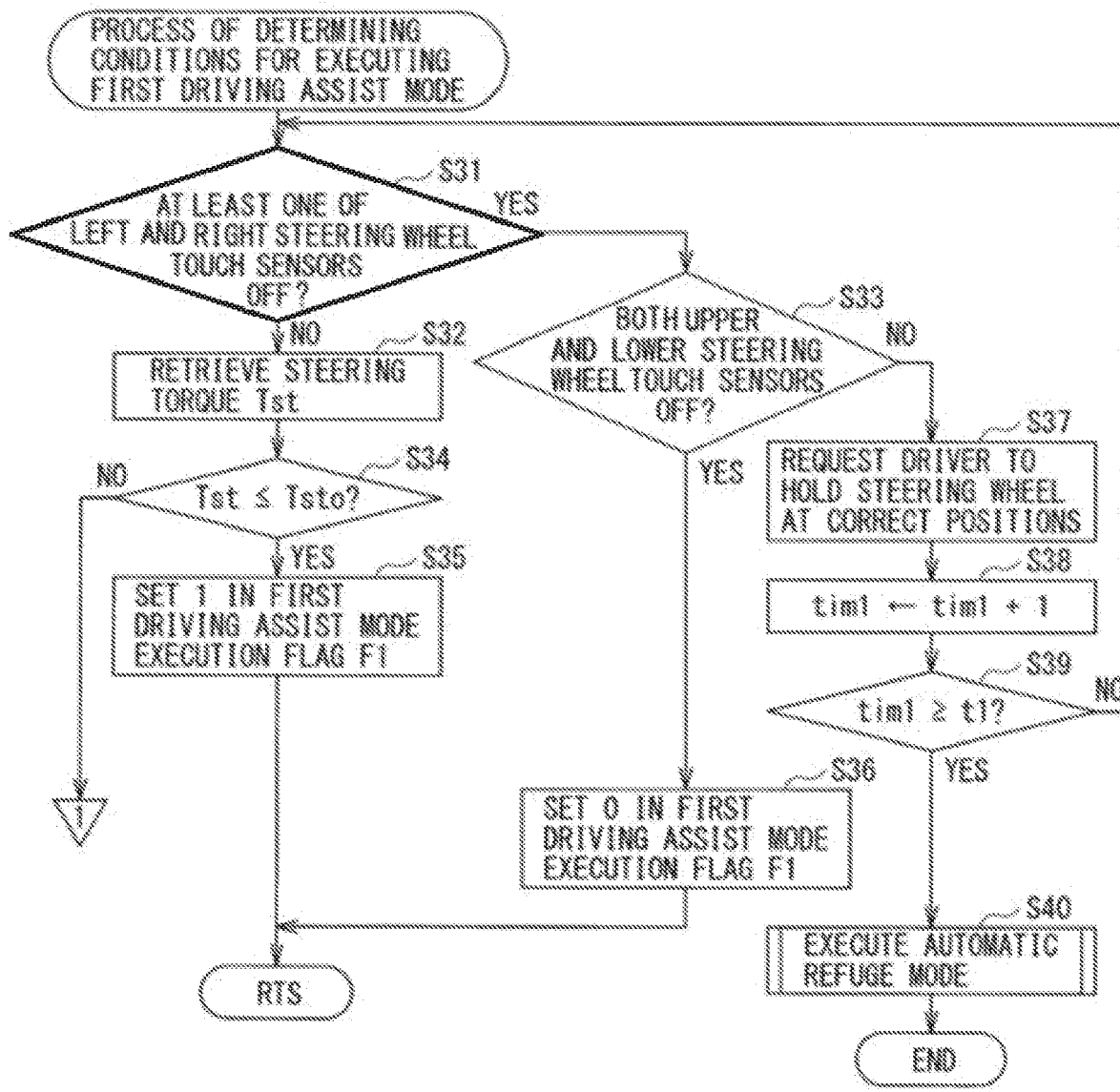
FIG. 5 is a flowchart illustrating an example of a subroutine related to a process of determining conditions for executing a first driving assist mode.

In a case where the lane lines that define right and left of the lane in which the own vehicle M is traveling are recognized by the camera unit 21 and the target traveling path is set, the driving mode setting calculator 22 may execute a subroutine related to a process of determining conditions for executing the first driving assist mode illustrated by way of example in FIG. 5. In a case where the target traveling path is not set, the driving mode may be caused to make a transition to the manual driving mode.

In the subroutine illustrated in FIG. 5, at step S31, the driving mode setting calculator 22 may retrieve a signal from the left and right steering wheel touch sensor 42 (i.e., the left steering wheel touch sensor 421 and the right steering wheel touch sensor 42r) and determine whether the driver is holding the steering wheel in the correct posture.

In a case where the left steering wheel touch sensor 421 and the right steering wheel touch sensor 42r are both on, that is, in a case where neither of the left steering wheel touch sensor 421 and the right steering wheel touch sensor 42r is off (S31: NO), the driving mode setting calculator 22 may determine that the driver is holding the steering wheel in the correct posture, and the flow may proceed to step S32.

In a case where the left steering wheel touch sensor 421, the right steering wheel touch sensor 42r, or both are off (S31: YES), the driving mode setting calculator 22 may determine that the driving posture is not correct, and the flow may proceed to step S33.

Upon proceeding to step S32, the driving mode setting calculator 22 may retrieve the steering torque Tst detected by the steering torque sensor 44. At step S34, the driving mode setting calculator 22 may compare the retrieved steering torque Tst against a steering override determining threshold Tsto. The steering override determining threshold Tsto may be a value for checking whether the steering of the driver is intended by the driver himself/herself or is caused merely by an accidental contact. In an example implementation, the steering override determining threshold Tsto may take a fixed value. In another example implementation, the steering override determining threshold Tsto may take a variable value to be set in accordance with the vehicle speed.

In a case where Tst≤Tsto holds (S34: YES), the driving mode setting calculator 22 may determine that a contact, if any, of a body part of the driver, such as a hand or a knee, with the steering wheel 2 is within a range of a mere accidental contact, and the flow may proceed to step S35. At step S35, the driving mode setting calculator 22 may set a first driving assist mode execution flag F1 (i.e., set 1 in F1), and the flow may proceed to step S12 of FIG. 4. In a case where Tst>Tsto holds (S34: NO), the driving mode setting calculator 22 may determine that the steering is a steering override intended by the driver himself/herself, and the flow may return to step S4 of FIG. 3. At step S4, the driving mode setting calculator 22 may allow the manual driving mode to continue and exit the routine.

In one implementation, the driving mode setting calculator 22 that performs the processes in steps S31, S32, and S34 described above may serve as a "steering override determiner".

In this manner, the conditions for executing the first driving assist mode may include that the left and right steering wheel touch sensor 42 is on (i.e., both the left steering wheel touch sensor 421 and the right steering wheel touch sensor 42r are on) and that the steering torque Tst is equal to or lower than the steering override determining threshold Tsto, and setting these conditions makes it possible to effectively prevent a false determination. In a case where the driver is in contact with, or holding, either one or both of the upper and lower portions of the rim 2a of the steering wheel 2 (i.e., either one or both of the upper steering wheel touch sensor 43u and the lower steering wheel touch sensor 43d are on), it may be possible to call for the driver's attention by requesting the driver to hold the steering wheel at correct positions.

Upon proceeding to step S33 from step S31, the driving mode setting calculator 22 may retrieve a signal from the upper and lower steering wheel touch sensor 43 (i.e., the upper steering wheel touch sensor 43u and the lower steering wheel touch sensor 43d) and check whether the contact position on the steering wheel 2 is irregular. In a case where the upper steering wheel touch sensor 43u and the lower steering wheel touch sensor 43d are both off (S33: YES), this case may indicate that the driver is not holding the steering wheel, and the conditions are not satisfied. Thus, the flow may proceed to step S36, and the driving mode setting calculator 22 may clear the first driving assist mode execution flag F1 (i.e., set 0 in F1). Thereafter, the flow may proceed to step S12 of FIG. 4.

In a case where the upper steering wheel touch sensor 43u, the lower steering wheel touch sensor 43d, or both are on (S33: NO), the driving mode setting calculator 22 may determine that the driver is not holding the steering wheel in the correct posture, and the flow may proceed to step S37. At step S37, the driving mode setting calculator 22 may request the driver to hold the steering wheel at correct positions by announcing, for example but not limited to, "Please hold the steering wheel at correct positions" through the notification device 45, and the flow may proceed to step S38. At step S38, the driving mode setting calculator 22 may increment an alerting time tim1 (i.e., tim1←tim1+1), and the flow may proceed to step S39. At step S39, the driving mode setting calculator 22 may compare the alerting time tim1 against a set duration t1. In an example implementation, the set duration t1 may be, for example, from about 3 to about 5 [sec]. In a case where tim1<t1 holds (S39: NO), the flow may return to step S31, and the driving mode setting calculator 22 may stand by until the driver holds the steering wheel at correct positions (i.e., until the left steering wheel touch sensor 42l and the right steering wheel touch sensor 42r are both turned on).

In a case where the driver does not hold the steering wheel at correct steering wheel holding positions even when the alerting time tim1 has expired (i.e., tim1≥t1 holds) (S39: YES), that is, in a case where the left steering wheel touch sensor 42l, the right steering wheel touch sensor 42r, or both are on and where the upper steering wheel touch sensor 43u, the lower steering wheel touch sensor 43d, or both are on, the flow may proceed to step S40, and the driving mode setting calculator 22 may allow the automatic refuge mode to be executed and terminate the routine. When the automatic refuge mode starts being executed, the automatic driving control unit 51 may cause the own vehicle M to travel along the current traveling lane while the vehicle speed of the own vehicle M is being regulated to a legally permitted or designated lowest speed and stop the own vehicle M upon guiding the own vehicle M to a safe location, such as a side strip or a pedestrian walkway.

Upon proceeding to step S12 of FIG. 4, the driving mode setting calculator 22 may refer to a value in the first driving assist mode execution flag F1. In a case where F1=1 holds (S12: YES), the driving mode setting calculator 22 may determine that the conditions are satisfied, and the flow may proceed to step S13. In a case where F1=0 holds (S12: NO), the driving mode setting calculator 22 may determine that the conditions are not satisfied, and the flow may return to step S4 of FIG. 3. At step S4, the driving mode setting calculator 22 may allow the manual driving mode to continue and exit the routine.

Thereafter, upon proceeding to step S13, the driving mode setting calculator 22 may transmit, to the automatic driving control unit 51, an instruction signal that causes the first driving assist mode to be executed, and the flow may proceed to step S14. At step S14, the driving mode setting calculator 22 may check whether it is possible to make a transition from the first driving assist mode to the second driving assist mode.

The driving mode setting calculator 22 may determine whether it is possible to make a transition to the second driving assist mode on the basis of a degree of coincidence between the map curvature RMPU and the camera curvature RCAM, the left and right steering wheel touch sensor 42(i.e., the left steering wheel touch sensor 42l and the right steering wheel touch sensor 42r), and the upper and lower steering wheel touch sensor 43(i.e., the upper steering wheel touch sensor 43u and the lower steering wheel touch sensor 43d). In a case where the map curvature RMPU and the camera curvature RCAM coincide with each other as described above, the driving mode setting calculator 22 may execute a subroutine related to a process of determining conditions for executing the second driving assist mode illustrated by way of example in FIG. 6. In an example implementation, the driving mode setting calculator 22 may execute the stated subroutine in a case where the degree of coincidence is equal to or greater than 95% to 99%, for example. In a case where the map curvature RMPU and the camera curvature RCAM do no coincide with each other, the driving mode setting calculator 22 may allow the first driving assist mode to be executed.

Figure 6:
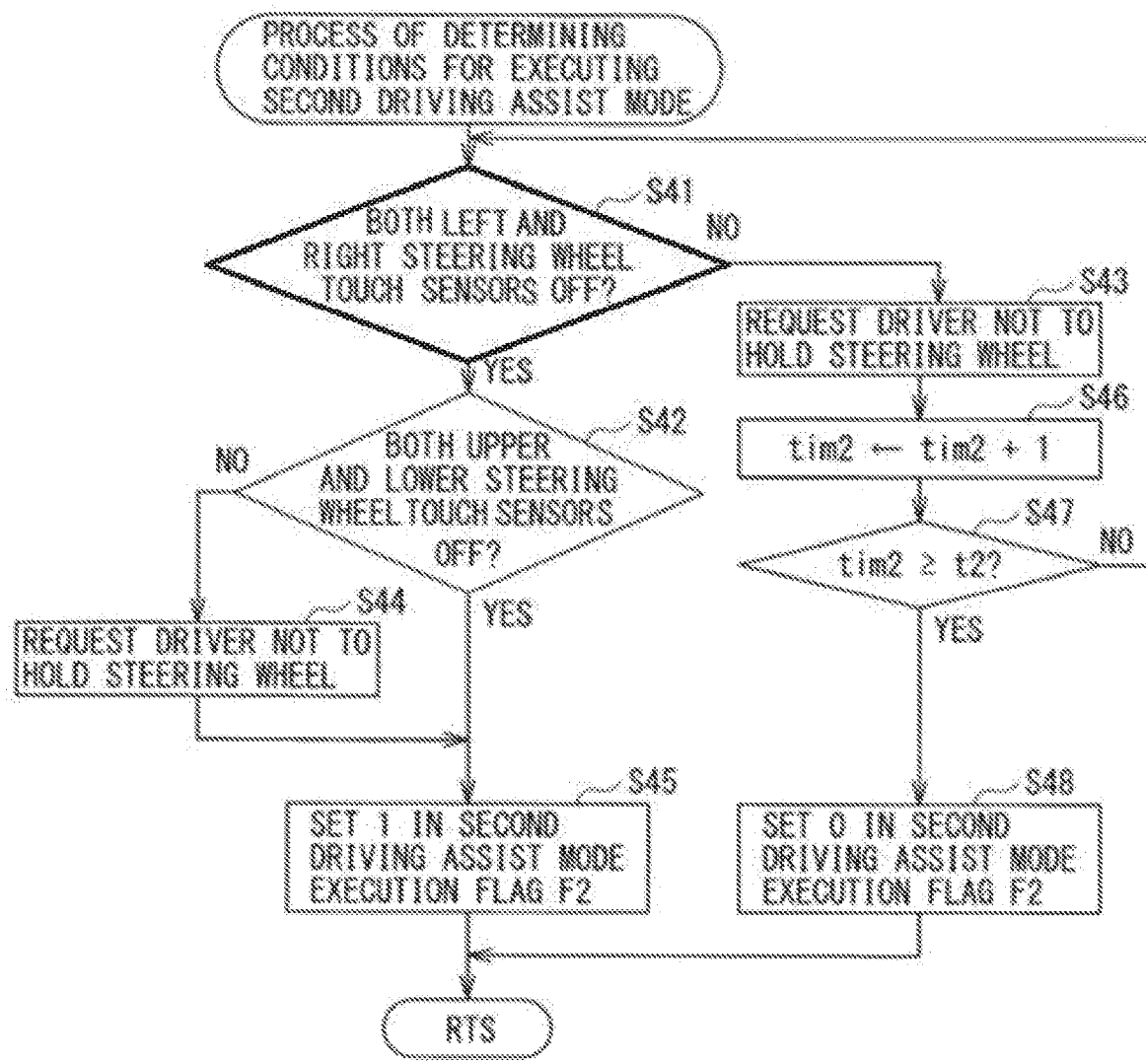
FIG. 6 is a flowchart illustrating an example of a subroutine related to a process of determining conditions for executing a second driving assist mode.

In the subroutine illustrated in FIG. 6, at step S41, the driving mode setting calculator 22 may retrieve a signal from the left and right steering wheel touch sensor 42 (i.e., the left steering wheel touch sensor 42l and the right steering wheel touch sensor 42r). In a case where the left steering wheel touch sensor 42l and the right steering wheel touch sensor 42r are both off (S41: YES), the flow may proceed to step S42. In a case where the left steering wheel touch sensor 42l, the right steering wheel touch sensor 42r, or both are on (S41: NO), the flow may proceed to step S43.

Upon proceeding to step S42, the driving mode setting calculator 22 may retrieve a signal from the upper and lower steering wheel touch sensor 43 (i.e., the upper steering wheel touch sensor 43u and the lower steering wheel touch sensor 43d). In a case where the upper steering wheel touch sensor 43u, the lower steering wheel touch sensor 43d, or both are on (S42: NO), the driving mode setting calculator 22 may determine that the steering is merely an accidental contact, and the flow may proceed to step S44. At step S44, the driving mode setting calculator 22 may request the driver not to hold the steering wheel by announcing, for example but not limited to, "You are on the steering wheel" through the notification device 45, and the flow may proceed to step S45.

In a case where the upper steering wheel touch sensor 43u and the lower steering wheel touch sensor 43d are both off (S42: YES), the driving mode setting calculator 22 may determine that the driver's hands are completely off the steering wheel 2, and the flow may proceed to step S45.

Upon proceeding to step S45 from one of step S42 and step S44, the driving mode setting calculator 22 may determine that it is possible to execute the second driving assist mode and set a second driving assist mode execution flag F2 (i.e., set 1 in F2). Thereafter, the flow may proceed to step S15 of FIG. 4.

In this manner, in the example implementation, in a case where the upper steering wheel touch sensor 43u, the lower steering wheel touch sensor 43d, or both are on, the driving mode setting calculator 22 may determine that the steering has been caused merely by an accidental contact by the driver and set the second driving assist mode execution flag F2 upon simply requesting the driver not to hold the steering wheel. Thus, it is possible to allow the second driving assist mode to continue. As a result, the driver need not worry about a slight contact with the steering wheel 2, which allows for achieving high usability.

Upon proceeding to step S43 from step S41, the driving mode setting calculator 22 may request the driver not to hold the steering wheel by announcing, for example but not limited to, "You are on the steering wheel, and the automatic driving with your hands off the steering wheel will be cancelled" through the notification device 45. Thereafter, the flow may proceed to step S46. At step S46, the driving mode setting calculator 22 may increment an alerting time tim2 (i.e., tim2←tim2+1), and the flow may proceed to step S47. At step S47, the driving mode setting calculator 22 may compare the alerting time tim2 against a set duration t2. In an example implementation, the set duration t2 may be, for example, from about 3 to about 5 [sec]. In a case where tim2<t2 holds (S47: NO), the flow may return to step S41, and the driving mode setting calculator 22 may stand by until the driver moves his/her hands off the normal holding positions (i.e., until the left steering wheel touch sensor 42l and the right steering wheel touch sensor 42r are both turned off).

In a case where tim2≥t2 holds (S47: YES), the driving mode setting calculator 22 may determine that the driver has no intention of moving his/her hands off the steering wheel 2, and the flow may proceed to step S48. At step S48, the driving mode setting calculator 22 may clear the second driving assist mode execution flag F2 (i.e., set 0 in F2), and the flow may proceed to step S15 of FIG. 4.

At step S15, the driving mode setting calculator 22 may refer to a value in the second driving assist mode execution flag F2. In a case where the driving mode setting calculator 22 determines that the conditions are satisfied, as in F2=1 (S15: YES), the flow may proceed to step S16. In a case where the driving mode setting calculator 22 determines that the conditions are not satisfied, as in F2=0 (S15: NO), the flow may proceed to step S17.

Upon proceeding to step S16, the driving mode setting calculator 22 may transmit, to the automatic driving control unit 51, an instruction signal that causes the second driving assist mode to be executed, and the flow may proceed to step S18. At step S18, the driving mode setting calculator 22 may again execute the subroutine related to the process of determining conditions for executing the first driving assist mode illustrated in FIG. 5 described above in order to check whether to cause the driving mode to make a transition from the second driving assist mode to the first driving assist mode.

In this subroutine related to the process of determining conditions for executing the first driving assist mode, that the left and right steering wheel touch sensor 42 is on (i.e., both the left steering wheel touch sensor 42l and the right steering wheel touch sensor 42r are on) and that the steering torque Tst is equal to or lower than the steering override determining threshold Tsto may serve as the conditions for making a transition to the first driving assist mode. Therefore, the conditions for the transition may not be satisfied when the driver merely makes an accidental contact with the left and right steering wheel touch sensor 42, and it is possible to allow the second driving assist mode to continue. Thus, it is possible to prevent a false determination and to obtain high usability.

Thereafter, the flow may proceed to step S19, and the driving mode setting calculator 22 may check the value in the first driving assist mode execution flag F1. In a case where F1=0 holds (S19: NO), the flow may proceed to step S20, and the driving mode setting calculator 22 may retrieve a signal from the automatic driving switch 41. In a case where the signal from the automatic driving switch 41 is on (i.e., is not off) (S20: NO), the flow may return to step S14. At steps S14 and S15, the driving mode setting calculator 22 may check on the conditions for executing the second driving assist mode.

In a case where the conditions are satisfied, the driving mode setting calculator 22 may allow the second driving assist mode to continue. In a case where the automatic driving switch 41 is off (S20: YES), the flow may return to step S4 of FIG. 3, and the driving mode setting calculator 22 may execute the manual driving mode and exit the routine. In a case where the driving mode setting calculator 22 determines in step S19 that F1=1 holds (S19: YES), the flow may proceed to step S21, and the driving mode setting calculator 22 may cause the driving mode to make a transition to the first driving assist mode and exit the routine.

Upon proceeding to step S17 from step S15, the driving mode setting calculator 22 may retrieve the steering torque Tst detected by the steering torque sensor 44. At step S22, the driving mode setting calculator 22 may compare the retrieved steering torque Tst against the steering override determining threshold Tsto. The steering override determining threshold Tsto may be a value for checking whether the steering is intended by the driver or is caused merely by an accidental contact (i.e., a false detection). In an example implementation, the steering override determining threshold Tsto may take a fixed value. In another example implementation, the steering override determining threshold Tsto may take a variable value to be set in accordance with the vehicle speed.

In a case where Tst≤Tsto holds (S22: YES), the driving mode setting calculator 22 may determine that a contact, if any, of a body part of the driver, such as a hand or a knee, with the steering wheel 2 is within a range of a mere accidental contact and exit the routine. In one implementation, the driving mode setting calculator 22 that performs the processes in step S41 of FIG. 6 and steps S17 and S22 of FIG. 4 described above may serve as the "steering override determiner".

At a subsequent time of executing the calculation, the driving mode setting calculator 22 may check on the conditions for executing the first driving assist mode in steps S11 and S12 of FIG. 4. In a case where the conditions are satisfied, the driving mode setting calculator 22 may cause the driving mode to make a transition to the first driving assist mode. In a case where Tst>Tsto holds (S22: NO), the driving mode setting calculator 22 may determine that the steering is a steering override, and the flow may proceed to step S23. At step S23, the driving mode setting calculator 22 may execute the manual driving mode transition process, and the flow may thereafter return to step S4 of FIG. 3. At step S4, the driving mode setting calculator 22 may execute the manual driving mode (i.e., turn off the automatic driving switch 41) and exit the routine.

Figure 7:
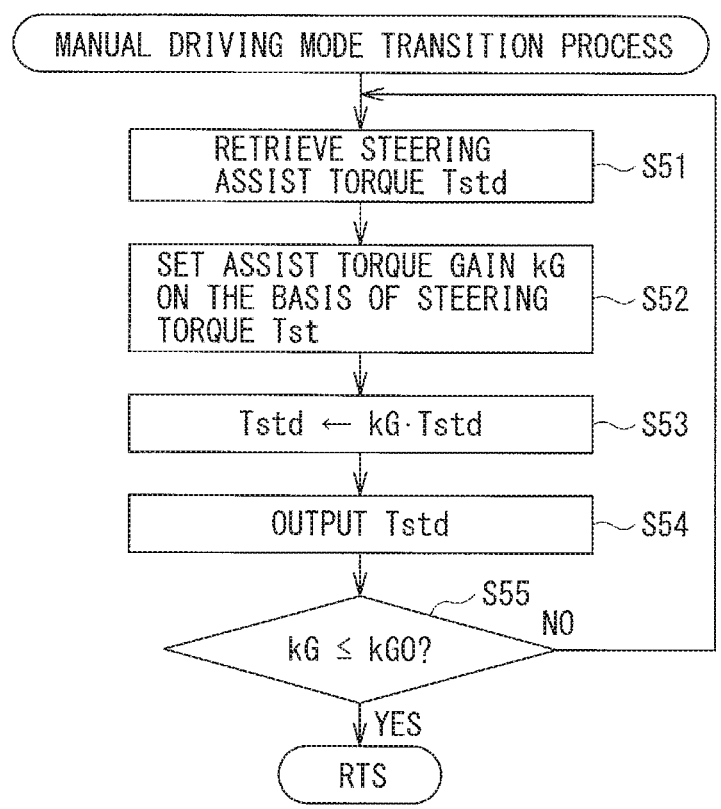
FIG. 7 is a flowchart illustrating an example of a subroutine related to a manual driving mode transition process.

The manual driving mode transition process described above may be executed in accordance with a subroutine related to the manual driving mode transition process illustrated by way of example in FIG. 7. According to the manual driving mode transition process, when the driving mode is caused to make a transition from the first driving assist mode to the manual driving mode, the proportion of a steering assist torque in automatic steering may be reduced gradually to allow the driver to take over the steering wheel operation stepwise into the manual driving mode. The steering assist torque may be produced by an electric power steering (EPS) motor (not illustrated) provided in an EPS steering system of the own vehicle M.

Figure 8A:
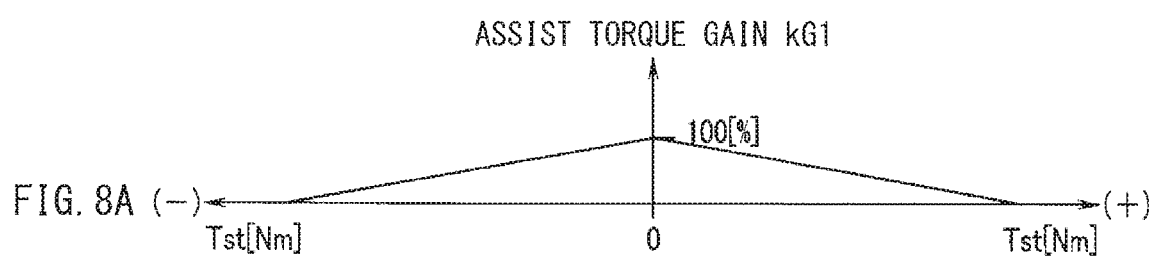
FIG. 8A is a conceptual diagram of an example of a table for setting an assist torque gain.

For example, at step S51, the driving mode setting calculator 22 may retrieve a steering assist torque Tstd output from the EPS motor to the steering system. At step S52, the driving mode setting calculator 22 may refer to an assist torque gain table to set an assist torque gain kG on the basis of the steering torque Tst detected by the steering torque sensor 44 and produced by the steering wheel operation of the driver. FIG. 8A conceptually illustrates the assist torque gain table.

As illustrated in FIG. 8A, the assist torque gain kG may be at 100 [%] in a released state in which the steering torque Tst is 0, that is, no steering intervention by the driver is present, and the assist torque gain kG may be set to a lower value from the value held in the released state along with an increase in the steering torque Tst. The assist torque gain kG may reach 0 [%] at a predetermined steering torque Tst, and the driving may be taken over completely thereafter with a manual steering operation of the driver. In FIG. 8A, the steering in the clockwise direction is represented by a plus sign (+), and the steering in the counterclockwise direction is represented by a minus sign (−).

Thereafter, upon proceeding to step S53, the driving mode setting calculator 22 may multiply the steering assist torque Tstd by the assist torque gain kG to set a new steering assist torque Tstd (Tstd←kG·Tst), and the flow may proceed to step S54. At step S54, the driving mode setting calculator 22 may output the new steering assist torque Tstd to an EPS control system to cause the EPS motor (not illustrated) to operate. The steering intervention by the driver may start while the steering torque Tst is 0, and the steering torque Tst may gradually increase thereafter.

Figure 8B:
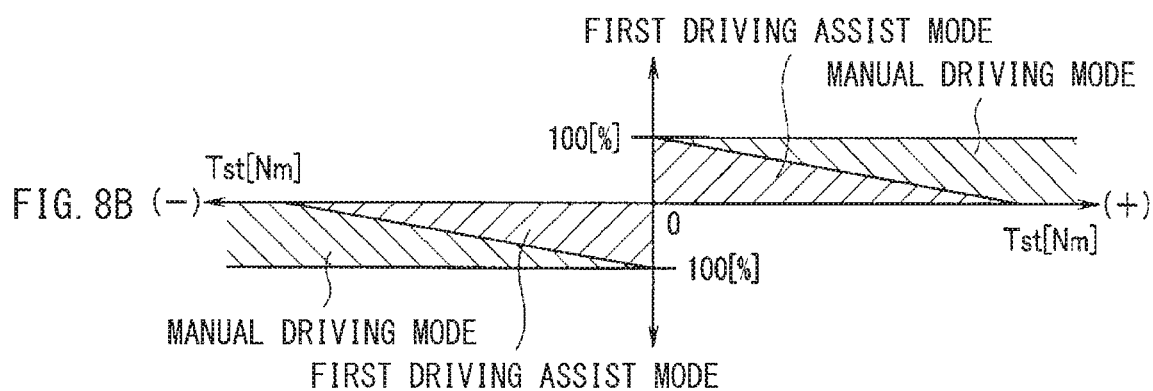
FIG. 8B is a conceptual diagram of an example of a table illustrating a transition ratio between a first driving assist mode and a manual driving mode.

Therefore, by reducing the steering assist torque Tstd from the EPS motor at a gain corresponding to the steering torque Tst, even when the driver performs a steering intervention, as illustrated in FIG. 8B, the driving mode may not be caused to make a sudden switch to the manual driving mode, and the driving mode may be taken over smoothly from the first driving assist mode to the manual driving mode. In FIG. 8B, the steering in the clockwise direction is represented by a plus sign (+), and the steering in the counterclockwise direction is represented by a minus sign (−).

In this case, the assist torque gain kG may be corrected with a reliability [%] set on the basis of a steering reliability. The steering reliability may be set in accordance with the level of an emergency situation. For example, in one of a case where there is a possibility of colliding with an obstacle in the direction of the steering torque Tst and a case where there is a possibility of crossing over a lane line, the steering reliability may be set low to avoid such a case through automatic steering.

Therefore, the steering direction and the steering amount may be compared against the target traveling path set by the automatic driving control unit 51, and the steering reliability may be set to a lower value as the deviation of the steering direction and the steering amount from the target traveling path is greater. Thereafter, the driving mode may be caused to make a transition to the automatic refuge mode. This, for example, may allow for quickly responding to an emergency situation while traveling in the first driving assist mode. Non-limiting examples of such an emergency situation may include a case where the driver becomes unconscious and unable to drive.

Thereafter, the flow may proceed to step S55, and the driving mode setting calculator 22 may compare the assist torque gain kG against a manual takeover determining threshold kGO. The driving mode setting calculator 22 may execute the routine repeatedly (S55: NO) until kG≤kGO holds. When kG≤kGO comes to hold (S55: YES), the flow may return to step S4 of FIG. 3, and the driving mode setting calculator 22 may execute the manual driving mode (i.e., turn off the automatic driving switch 41) and exit the routine.

In this manner, according to the example implementation, even in a case where the driver accidentally makes contact with the left and right steering wheel touch sensor 42 while traveling in the second driving assist mode, the conditions for making a transition to the first driving assist mode may not be satisfied in a case where the steering torque Tst is equal to or lower than the steering override determining threshold Tsto. Therefore, the transition into the manual driving mode may be prevented in a case of a mere accidental contact, and it is possible to reduce any sense of discomfort to be experienced by the driver.

In a case where the left and right steering wheel touch sensor 42 is on (i.e., both the left steering wheel touch sensor 421 and the right steering wheel touch sensor 42r are on) and where the steering torque Tst exceeds the steering override determining threshold Tsto, it may be determined that the steering is a steering intervention intended by the driver (i.e., a steering override). Thus, the steering override may be properly determined, and it is possible to prevent a false determination.

The technology is not limited by the example implementations described above. For example, it may suffice that the left and right steering wheel touch sensor 42 and the upper and lower steering wheel touch sensor 43 detect a position on the steering wheel at which the driver holds the steering wheel. Therefore, a steering wheel touch sensor may be disposed on the entire periphery of the rim 2a of the steering wheel 2, and this steering wheel touch sensor may be divided into segments by a predetermined angle. Thus, the contact position may be detected.

The driving mode setting calculator 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving mode setting calculator 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving mode setting calculator 22 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle driving assist system for a vehicle, the vehicle driving assist system comprising:
    a steering wheel contact position detector configured to detect a position on a steering wheel at which a driver makes a contact with the steering wheel, wherein the steering wheel contact position detector includes 1) a first steering wheel contact position detector provided in a first region of the steering wheel and 2) a second steering wheel contact position detector provided in a second region of the steering wheel different from the first region;
    a steering torque detector configured to detect a steering torque of the driver;
    a driving mode setting calculator configured to set a driving mode of the vehicle on a basis of a driving condition, the driving mode including 1) a first driving assist mode allowing for automatic driving while the driver holds the first region of the steering wheel, and 2) a second driving assist mode allowing for automatic driving while the driver does not hold the steering wheel; and a steering override determiner configured to determine whether the steering torque detected by the steering torque detector is a steering override intended by the driver or a false detection, on a basis of the position on the steering wheel at which the driver makes the contact with the steering wheel detected by the steering wheel contact position detector and the steering torque detected by the steering torque detector, wherein, when the steering wheel contact position detector detects the contact with the second steering wheel contact position detector while traveling in the second driving assist mode, the driving mode setting calculator is configured to allow the second driving assist mode to continue for a predetermined period after prompting the driver to move a hand off the steering wheel, and wherein, when the steering wheel contact position detector detects the contact with the first steering wheel contact position detector within the predetermined period and detects no steering override, the driving mode setting calculator is configured to cause the driving mode to transition to the first driving assist mode from the second driving assist mode.

2. The vehicle driving assist system according to claim 1, wherein the driving mode setting calculator is configured to prompt the driver to make the contact with the first steering wheel contact position detector and to allow the first driving assist mode to continue for a set duration, in a case where the steering wheel contact position detector detects the contact with the second steering wheel contact position detector while traveling in the first driving assist mode.

3. The vehicle driving assist system according to claim 2, wherein the driving mode setting calculator is configured to allow the first driving assist mode to continue, in a case where the steering wheel contact position detector detects the contact with the first steering wheel contact position detector within the set duration.

4. The vehicle driving assist system according to claim 3, wherein the driving mode setting calculator is configured to cause the driving mode to make a transition to an automatic refuge mode in a case where the steering wheel contact position detector continues to detect the contact with the second steering wheel contact position detector even after the set duration expires, the automatic refuge mode causing the vehicle to be guided to a safe location while restricting a vehicle.

5. The vehicle driving assist system according to claim 2, wherein the driving mode setting calculator is configured to cause the driving mode to make a transition to an automatic refuge mode in a case where the steering wheel contact position detector continues to detect the contact with the second steering wheel contact position detector even after the set duration expires, the automatic refuge mode causing the vehicle to be guided to a safe location while restricting a vehicle speed of the vehicle.

6. The vehicle driving assist system according to claim 1, wherein the driving mode setting calculator is configured to determine that the steering torque is the false detection and to allow the second driving assist mode to continue, in a case where the steering wheel contact position detector detects the contact with the second steering wheel contact position detector while traveling in the second driving assist mode.

7. The vehicle driving assist system according to claim 1, wherein the driving mode setting calculator is configured to gradually reduce a proportion of a steering assist torque in automatic steering to achieve a stepwise takeover to a manual driving mode allowing the driver to steer the steering wheel, in a case where the steering override determiner determines that the steering torque is the steering override while traveling in the first driving assist mode.

8. The vehicle driving assist system according to claim 1, wherein the driving mode further includes a manual driving mode allowing the driver to steer the steering wheel, and wherein, when the steering wheel contact position detector detects the contact with the first steering wheel contact position detector within the predetermined period and detects the steering override, the driving mode setting calculator is configured to cause the driving mode to transition to the manual driving mode from the second driving assist mode.

9. The vehicle driving assist system according to claim 1, wherein, when the steering wheel contact position detector detects no contact with the first steering wheel contact position detector and the second steering wheel contact position detector within the predetermined period, the driving mode setting calculator is configured to maintain the second driving assist mode.

10. The vehicle driving assist system according to claim 1, wherein, when the steering wheel contact position detector detects the contact with the first steering wheel contact position detector while traveling in the second driving assist mode, the driving mode setting calculator is configured to allow the second driving assist mode to continue for a predetermined period after alerting the driver.

11. A vehicle driving assist system for a vehicle, the vehicle driving assist system comprising:

a contact position detector configured to detect a position on a steering wheel at which a driver makes a contact with the steering wheel, wherein the contact position detector includes 1) a first steering wheel contact position detector provided in a first region of the steering wheel that is to be held by the driver in a correct posture and 2) a second steering wheel contact position detector provided in a second region of the steering wheel different from the first region;

a torque detector configured to detect a steering torque of the driver; and circuitry configured to
set a driving mode of an own vehicle on a basis of a driving condition, the driving mode including 1) a first driving assist mode allowing for automatic driving while the driver holds the first region of the steering wheel, and 2) a second driving assist mode allowing for automatic driving while the driver does not hold the steering wheel, determine whether the steering torque detected by the torque detector is a steering override intended by the driver or a false detection on a basis of the position on the steering wheel at which the driver makes the contact with the steering wheel detected by the contact position detector and the steering torque detected by the torque detector, allow, when the steering wheel contact position detector detects the contact with the second steering wheel contact position detector while traveling in the second driving assist mode, the second driving assist mode to continue for a predetermined period after prompting the driver to move a hand off the steering wheel, and cause, when the steering wheel contact position detector detects the contact with the first steering wheel contact position detector within the predetermined period and detects no steering override, the driving mode to transition to the first driving assist mode from the second driving assist mode cause the driving mode to make a transition to the first driving assist mode from the second driving assist mode.

\* \* \* \* \*